(12) United States Patent
Dakhil

(10) Patent No.: US 9,358,491 B2
(45) Date of Patent: Jun. 7, 2016

(54) CARBON DIOXIDE NEUTRALIZING POWER GENERATING DEVICE

(71) Applicant: Farouk Dakhil, Rome (IT)

(72) Inventor: Farouk Dakhil, Rome (IT)

( * ) Notice: Subject to any disclaimer, the term of this patent is extended or adjusted under 35 U.S.C. 154(b) by 252 days.

(21) Appl. No.: 14/168,484

(22) Filed: Jan. 30, 2014

(65) Prior Publication Data

US 2015/0211489 A1  Jul. 30, 2015

(51) Int. Cl.
*B01D 53/02* (2006.01)
*F03D 9/00* (2016.01)
*F03B 13/22* (2006.01)
*F03B 13/26* (2006.01)
*B01D 53/04* (2006.01)
*B01D 53/62* (2006.01)

(52) U.S. Cl.
CPC ............ *B01D 53/02* (2013.01); *B01D 53/0407* (2013.01); *B01D 53/62* (2013.01); *F03B 13/22* (2013.01); *F03B 13/264* (2013.01); *F03D 9/00* (2013.01); *B01D 2251/404* (2013.01); *B01D 2253/204* (2013.01); *B01D 2257/504* (2013.01); *F05B 2210/18* (2013.01); *F05B 2240/40* (2013.01); *Y02C 10/04* (2013.01); *Y02C 10/06* (2013.01); *Y02C 10/08* (2013.01); *Y02E 10/28* (2013.01); *Y02E 10/38* (2013.01); *Y02E 10/725* (2013.01)

(58) Field of Classification Search
CPC .................. B01D 2251/404; B01D 2253/204; B01D 2257/504; B01D 53/02; B01D 53/0407; B01D 53/62; F03B 13/22; F03B 13/264; F03D 9/00; F05B 2210/18; F05B 2240/40; Y02C 10/04; Y02C 10/06; Y02C 10/08; Y02E 10/28; Y02E 10/38; Y02E 10/725

See application file for complete search history.

(56) References Cited

U.S. PATENT DOCUMENTS

| | | | | |
|---|---|---|---|---|
| 6,830,596 | B1* | 12/2004 | Deckman ................. | B01J 8/009 422/202 |
| 2002/0152891 | A1* | 10/2002 | Massimo ............. | B01D 53/047 95/96 |
| 2003/0024853 | A1* | 2/2003 | Lyon .......................... | C10L 3/06 208/108 |
| 2008/0289495 | A1* | 11/2008 | Eisenberger ....... | B01D 53/1475 95/107 |
| 2008/0302106 | A1* | 12/2008 | Wakefield ............. | F01K 23/067 60/781 |
| 2010/0005966 | A1* | 1/2010 | Wibberley ......... | B01D 53/1425 95/179 |
| 2010/0084283 | A1* | 4/2010 | Gomez ................. | B01D 53/864 205/742 |
| 2011/0067410 | A1* | 3/2011 | Zubrin .................... | F01K 13/00 60/780 |
| 2011/0120137 | A1* | 5/2011 | Ennis ................. | H01M 8/04082 60/780 |
| 2011/0296872 | A1* | 12/2011 | Eisenberger ........... | B01D 53/04 62/640 |
| 2013/0312606 | A1* | 11/2013 | Eisenberger ......... | B01D 53/047 95/104 |

* cited by examiner

*Primary Examiner* — Christopher P Jones
(74) *Attorney, Agent, or Firm* — Maier & Maier, PLLC

(57) ABSTRACT

A carbon dioxide sequestering and power generating device. The carbon dioxide sequestering and power generating device can include a bladed turbine driving a dynamo, a $CO_2$-absorbing portion, and dielectric cushions. Air may flow into the device through one or more openings, simultaneously generating power while $CO_2$ is drawn out of the air through passive processes. Generated electricity may be stored or transferred to a grid. Sequestered $CO_2$ may be stored to be recycled or otherwise disposed of.

18 Claims, 15 Drawing Sheets

CARBON DIOXIDE NEUTRALIZING POWER GENERATING DEVICE

BACKGROUND

The emission of pollutants due to industry and automobiles such as smog-causing sulphur compounds, carbon dioxide, carbon monoxide, and nitrogen oxides has caused ever-increasing problems including health hazards and global warming that are becoming the world's most dangerous and preoccupying matters. In addition, the rapid increase in the demand for automobiles in the Asian market, which has doubled in the last four years, requires an urgent solution. The Earth's population is continuously increasing, requiring more energy and putting pressure on the world community to find reliable and clean solutions for these problems.

The emission of $CO_2$ into the air is ever increasing because $CO_2$ cannot easily be neutralized. Instead, it accumulates in the atmosphere to intolerable ever-higher levels which are almost suffocating humans and animals alike. The situation is becoming worse because humans are not only increasing their $CO_2$ emissions into the atmosphere but are also deforesting tropical trees, which are nature's sink for capturing $CO_2$ through photosynthesis. The result is what is commonly known as global warming, which is caused mainly by the accumulation of $CO_2$ through the greenhouse effect. Despite this, burning fossil fuels around the world create 3.5 billion metric tons of $CO_2$ per year. This production comes mainly (40%) from power plants, since about 5000 power plants use coal and/or gas. Since the beginning of the industrial era $CO_2$ in the atmosphere has risen from 280 to almost 400 ppm. If nothing is done, by 2100 scientists expect it to rise to 500-1000 ppm. In part because of this, temperatures are expected to rise by approximately 5.2° C., which will trigger sea-level rise and ocean acidity is expected to increase by as much as 150%.

Fossil fuel is the foundation upon which today's world economy is built. The continuous burning of oil to generate electricity or to run engines has a dangerous and threatening side effect, which is the emission of $CO_2$. Many technologies have been developed to limit or decrease the emission of $CO_2$ in almost all power applications, and particularly in vehicles. However the rate at which the world is producing $CO_2$ is still a threat, particularly if one takes into consideration the emission in the past ten years of $CO_2$ by the emerging markets in Asia and South America. In addition to all the new emissions of $CO_2$ the rain forests in South America and Asia are being decimated, if not completely eradicated, for timber. Today's level of $CO_2$ in the atmosphere is 36% higher than the beginning of the industrial revolution in Europe. It is expected to double by 2050 if the world's industry continues at the present emission rates. Unfortunately $CO_2$ has a very long life time in the atmosphere compared with other toxins like nitric oxides or sulfur oxides. Thus it has a compounding effect by adding to the amounts of $CO_2$ in the air as time goes by, because past $CO_2$ emissions are not eliminated.

One problem with removing $CO_2$ from the air is that it can in itself require energy, thereby increasing $CO_2$ output from other energy-producing locations. There is a need for a cost-effective, safe, and efficient clean energy production solution which can be implemented using current engineering principles and manufactured without overburdening complexity

SUMMARY

A carbon dioxide sequestering and power generating device may be disclosed. The carbon dioxide sequestering and power generating device can include a bladed turbine driving a dynamo, a $CO_2$-absorbing portion, and dielectric cushions. Air may flow into the device through one or more openings, simultaneously generating power while $CO_2$ is drawn out of the air through passive processes. Generated electricity may be stored or transferred to a grid. Sequestered $CO_2$ may be stored to be recycled or otherwise disposed of.

BRIEF DESCRIPTION OF THE FIGURES

Advantages of embodiments of the present invention will be apparent from the following detailed description of the exemplary embodiments. The following detailed description should be considered in conjunction with the accompanying figures in which.

Exemplary

Exemplary

Exemplary

Exemplary

Exemplary

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

According to at least one exemplary embodiment, a carbon dioxide sequestering and power generating device may be disclosed. The carbon dioxide sequestering and power generating device can include a bladed turbine driving a dynamo, a $CO_2$-absorbing portion, and dielectric cushions. Air may flow into the device through one or more openings, simultaneously generating power while $CO_2$ is drawn out of the air through passive processes. Generated electricity may be stored or transferred to a grid. Sequestered $CO_2$ may be stored to be recycled or otherwise disposed of.

Figure 1:
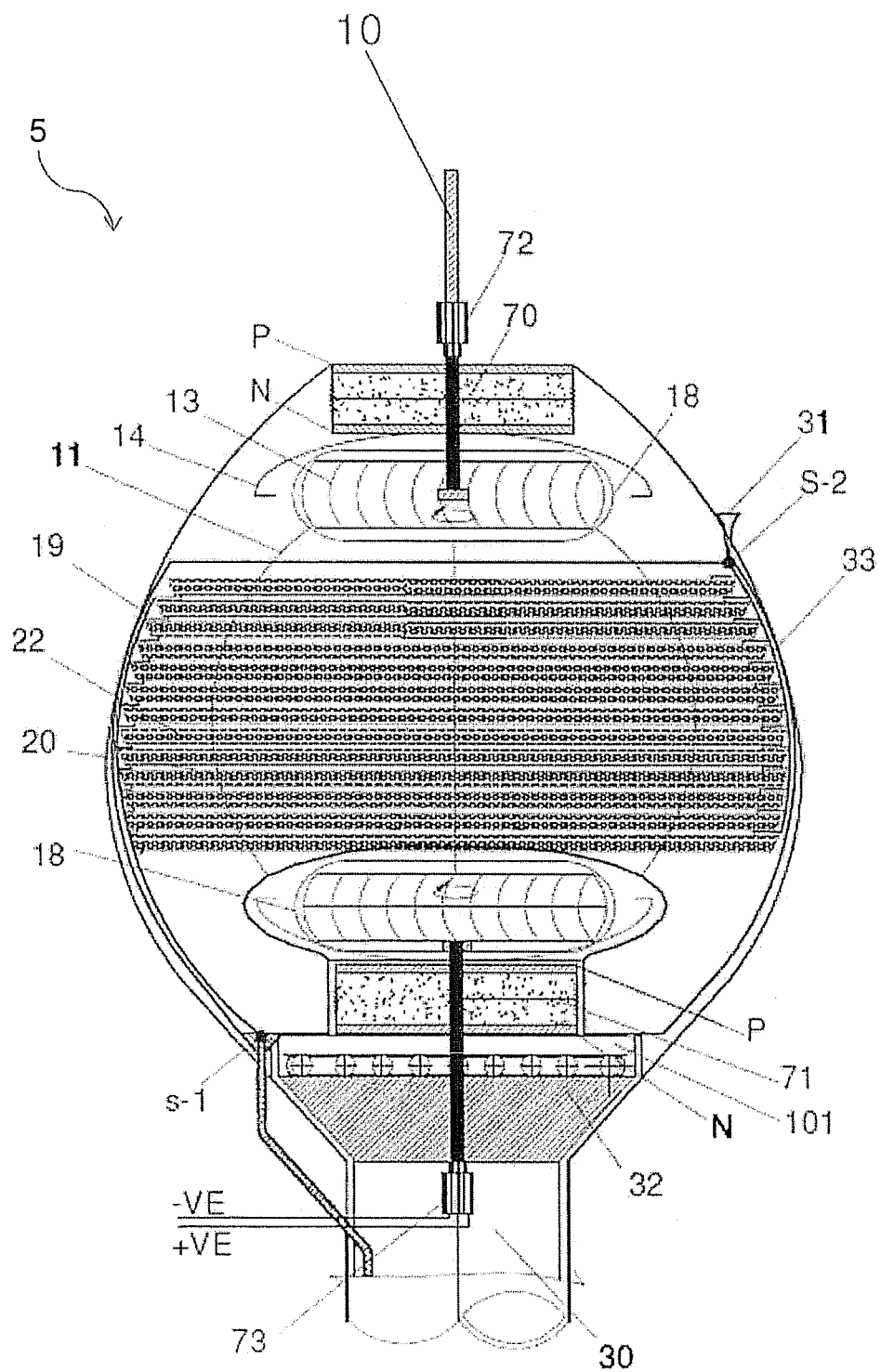
FIG. 1 shows a cross-section of a first embodiment of a carbon dioxide sequestering device Exemplary

Referring to exemplary FIG. 1, a carbon dioxide sequestering and power generating device (5) may consist of a wind-capture turbine with blades (13) and at least one $CO_2$ absorbing portion (22). Device 5 may be placed on a moving platform 101 which may move according to the blowing direction of the wind through the use of a wind directional wing structure. Said structure may be a wind tracking assembly which may function to bring both openings 18 of said device 5 towards the direction of the blowing winds at all times, and may be further described below. Additionally, device 5 may be supported by a column 30. Column 30 may provide a housing through which all electrical wires and drainage tubes with saturated absorbent (20) are brought downwards. Column 30 may be constructed of any sturdy material, for example, steel.

A $CO_2$-absorbing material (20) may be placed in a specially designed carbon dioxide-absorbing chamber which may include a container 22. Container 22 may be subdivided into multiple layers or compartments to allow maximum exposure surface area to the incoming $CO_2$-polluted air. $CO_2$-absorbing material may be, for example $Ca(OH)_2$ (calcium hydroxide). $CO_2$-absorbing material 20 may be in aqueous form to increase the efficacy of its $CO_2$ sequestration. Additionally, $CO_2$-absorbing material 20 may be in liquid form, or as desired. The area of the sub-containers may expose $CO_2$-absorbing material 20 to inflowing wind and may be large enough and well exposed to the incoming air flow to efficiently sequester the $CO_2$ in the incoming air. Each sub-container of container 22 may have a drainage opening substantially on its bottom. $CO_2$-absorbing material 20 may be introduced to the sub-containers through opening inlet 31 controlled by sensor S2.

A $CO_2$-absorbing material such as an aqueous solution of $Ca(OH)_2$ may absorb CO2 up to a 50% saturation and still remain in solution form without a precipitate forming.

At the end of drainage tube (19) there may be an electrochemical sensor S1. Sensor S1 may include a valve located proximate to the bottom of main container 22. Sensor S1, through said valve, may allow the drainage of $CO_2$-absorbing material once it reaches or passes a certain saturation threshold, for example 50% saturated. Preferably, $CO_2$-absorbing material may be drained prior to precipitation of any solute from solution or prior to solidification of a liquid absorbing material, thus allowing the drainage to be in solution or liquid form. Tube 19 may have a separable and flexible end-tube part which may connect said valve at S1 with a main tube in column 30 which may conduct the spent $CO_2$-absorbing material to a storage tank (not shown). In one embodiment, within the storage container, the spent $CO_2$-absorbing material may be allowed to continue to saturate such that a solid precipitate forms, for example if aqueous $Ca(OH)_2$ is used as the absorbing material, it may form a $CaCO_3$ precipitate after prolonged exposure to $CO_2$. To allow for the continued saturation, the storage container may be open to the air, allowing more $CO_2$-containing air to flow in. Captured $CO_2$ may be later recovered, if desired, for use in another application, for example in a micro-algae farm.

The flexible end-tube part of tube 19 may allow device 5 to rotate on its axis upon the bearing-cushion 101 and maintain a connection with the drainage tube along the main column structure.

The inlet for $CO_2$-absorbing material (31) may be automatically controlled by pressure-sensitive solenoid valve at S2 which may automatically open once the $CO_2$ has been absorbed by the $CO_2$-absorbing material and the $CO_2$-absorbing material reached a saturation threshold. Fresh $CO_2$-absorbing material may then be allowed into the device through the S2 opening through tube 33. In one non-limiting example, all sub-containers may have substantially the same volume such that the opening and closing of the inlet-valve may fill all the sub-containers with substantially the same amount of $CO_2$-absorbing material.

As shaft 10 rotates, blades 13 may be positioned and directed in a way such that the wind blowing through may create a rotational movement. Blades 13 and shaft 10 may be made of light and strong material, for example a carbon-fiber polymer, or as desired. Openings 18 may be located proximate to the top and bottom, to allow wind to pass through device from both sides. In another embodiment, openings 18 may be located on the front and back. Other configurations of openings 18 are also envisioned, and openings 18 may be located as desired. Blades 13 may be placed on a hinge structure which may allow shaft 10 to rotate inside a stator 72 of a dynamo. There may be another structure 14 placed with a hinge mechanism around a sliding cylinder independent of blades 13 such that structure 14 may be allowed to move up and down as forced by the blowing wind, which may create a pressure upon dielectric (DE) multi-layer cushions 70/71. Structure 14 may be shaped substantially similarly to a donut sliced in half along its x-axis. Structure 14 may slide along cylinder containing shaft 10 in an up-and-down movement as the wind blows through the device. Shaft 10 may be located inside two concentric cylinders. In the center of this double cylinder may be shaft 10, which may rotate inside the first cylinder with a bearing system. Along the second cylinder may be structure 14, which may slide on a hinge type mechanism up and down as forced by the wind between the DE multi-layer material and two shock absorbers at the other end. This up and down oscillation of structure 14 may create a pressure upon DE material. The detail of this structure and operation may be shown in exemplary FIG. 1b and further explained below. Said shaft-end 10 may rotate inside a stator/dynamo 72/73. Both the rotation of said shaft 10 inside the stator 72 and the pressurization of the DE material cushion 70 by means of structure 14 may produce an electrical current which may be conducted to a battery for storage or connected to a transformer of a grid, or as desired.

The DE multi-layer cushions 70/71 may have a shape substantially similar to a large truck's tire, may absorb substantially all of any upward thrust generated by wind flowing into the structure, and may convert the pressure into an electric current. On either side of DE material may be located N-P junctions. In at least one exemplary embodiment, cushions 70 and 71 are made of multiple layers of DE material with N-P junctions and may have an elastic spring-like structure to allow for compression and de-compression. For example, structure 14 may compress and decompress DE cushions 70 and 71 through an upward or downward motion.

The surface of container 22 may be air permeable and may allow air to circulate freely, which may allow for maximum contact of air with the $CO_2$-absorbing material.

After sufficiently saturated $CO_2$-absorbing material is drained by electrochemically sensitive solenoid valve/sensor S1, fresh $CO_2$-absorbing material may be injected by pressure-sensitive solenoid valve S2 to replace the saturated $CO_2$-absorbing material. According to one non-limiting example, the availability of fresh $CO_2$-absorbing material may be provided by a central main tower connected to all devices, for example at inlet 31. The central main tower may be placed higher than all devices 5 to use the force of gravity for the required flow of fresh solution 20 to each device, which is controlled by pressure-sensitive solenoid valves S2. The supply system may be a centralized closed system in a fenced/protected field/park. An exemplary embodiment of this arrangement may be shown in exemplary FIG. 6 and further described below.

There may be a simple wind tracking mechanism (not shown here) on top of device 5 to allow device 5 to rotate on its axis upon bearing cushion 101. Rotation may be assisted by bearings 102 as shown in exemplary FIG. 1c and described below. The wind tracking mechanism may be shaped and function in a fashion similar to a weather vane, and may be coupled to device 5 such that it may rotate device 5 into a position where openings 18 may allow the wind to pass through more efficiently. This wind tracking mechanism may function as a passive tracking system, allowing for greater efficient and minimum energy consumption, utilizing the available wind energy for movement. One embodiment of a wind tracking mechanism may be shown in exemplary FIG. 1e and further described below.

Figure 1A:
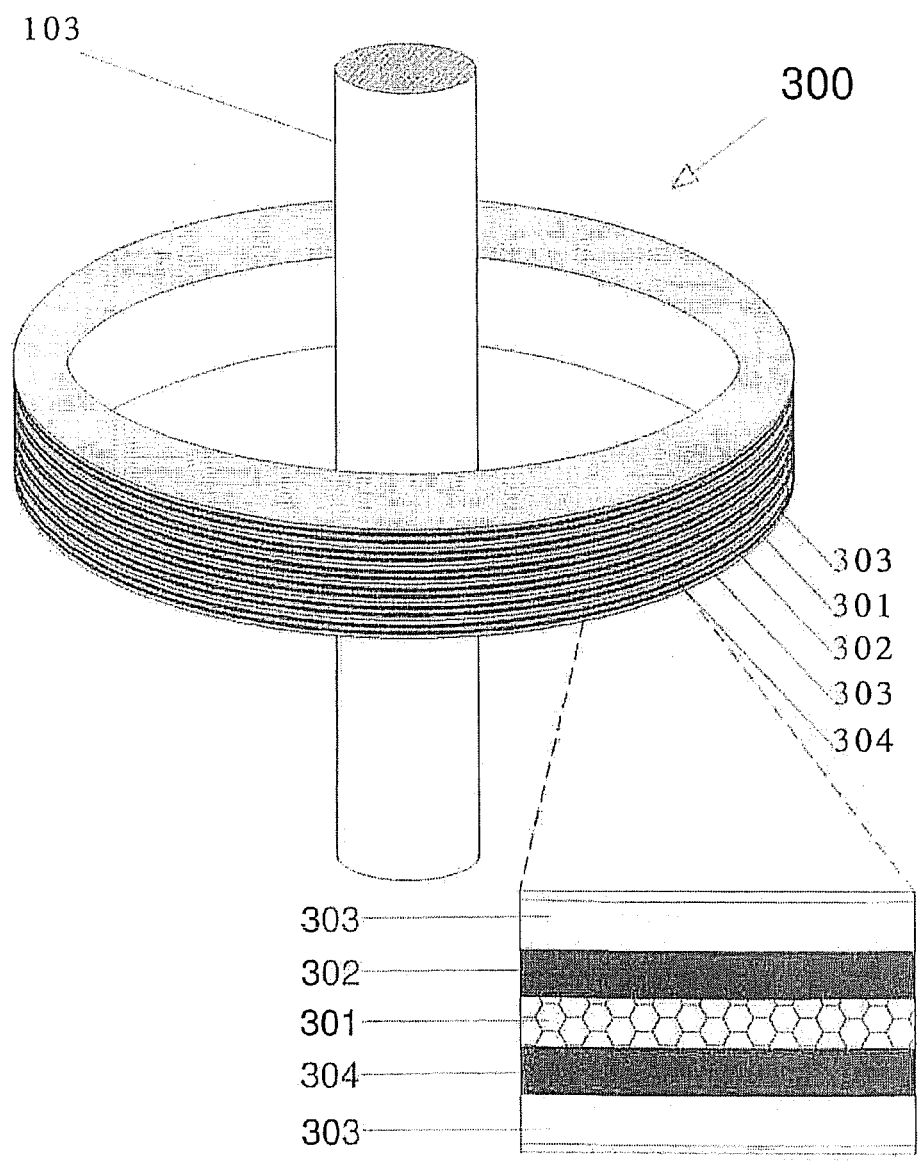
FIG. 1a shows dielectric (DE) cushion located around a central shaft Exemplary FIG. 1aa shows a detailed cross-section of the layers of a DE cushion Exemplary
Figure 1A:
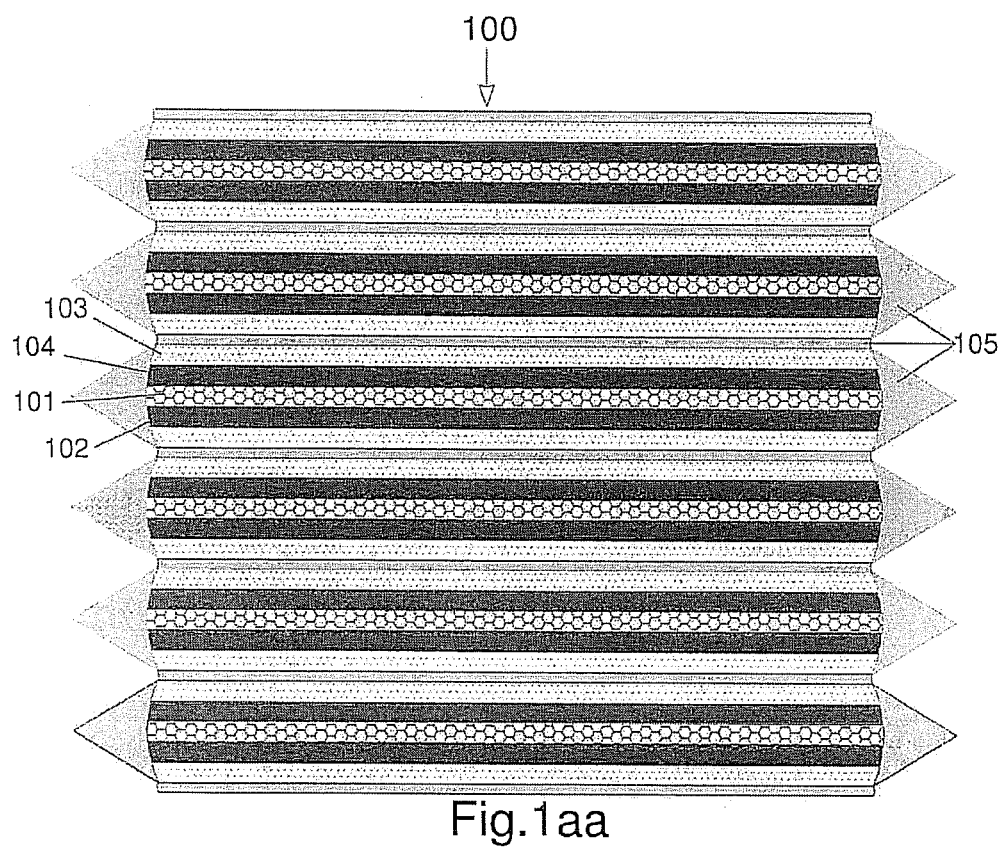

Referring now to the above-referenced figures and to exemplary FIG. 1a, a DE cushion 300 may be shaped substantially like a tire, or donut. DE cushion 300 may be one embodiment of cushion 70 and may be located around a shaft 103 as described above. DE cushion 300 may be composed of multiple layers, for example six layers. Each layer may be composed of the DE material 301 placed between two electrodes 302, 304, and further encapsulated by non-conducting insulation 303. Insulation 303 may be constructed of a carbon-reinforced polymer, or as desired.

Referring now to the above-referenced figures and to exemplary FIG. 1aa, a DE cushion with six layers may be disclosed. As pressure is exerted upon the cushion, a current may be generated in the DE material, as explained above. An advantage of having multiple layers in the DE cushion is that it may increase the amount of current generated and thus the overall power generation of the device. Each layer of DE material may be sandwiched in an N-P junction 102,104 to transmit produced current to a battery (not shown), a grid, or as desired. Further, N-P junction may be inserted within an insulating material 103 on both sides. Also each layer may be protected by an elastic material 105. Elastic material 105 absorb any excess pressure exerted on the cushion, protecting it. Elastic material 105 may be made of rubber, or as desired.

Figure 1B:
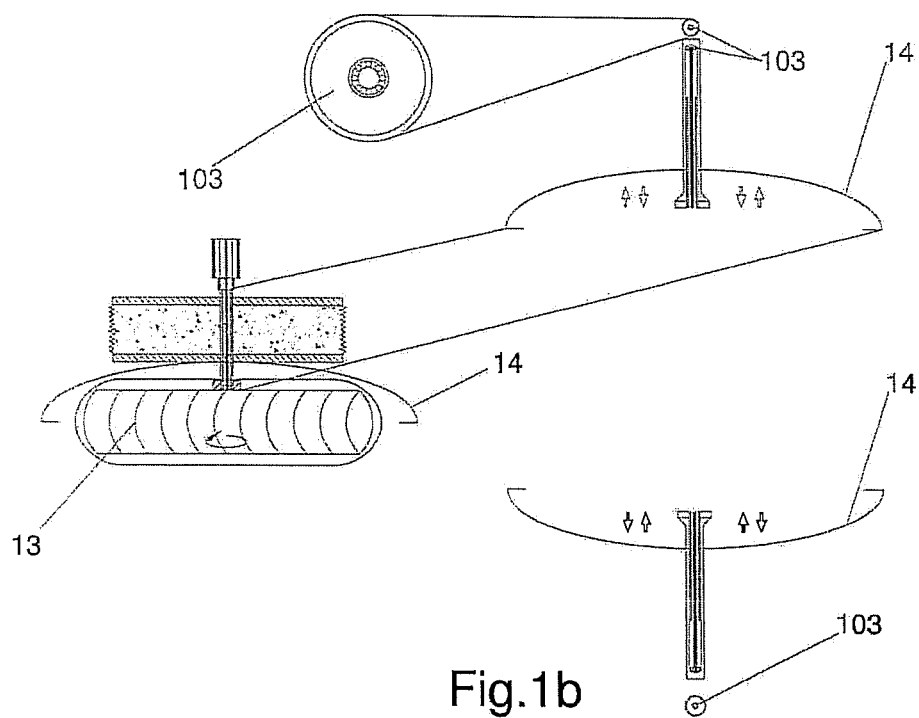
FIG. 1b shows a up-and-down moving structure which may compress and decompress a DE cushion.

Referring now to the above-referenced figures and exemplary FIG. 1b, structure 14 may move up and down along a hinge on the axis shaft of the rotating blades 13 as wind blows through the apparatus 5. The axis shaft may rotate within a bearing structure 103 that may hold structure 14 just above or just below motor/dynamo 72. As structure 14 moves up and down it may exert a pressure force upon cushion 70 which may produce current through the DE material inside cushion 70 as explained above.

Figure 1C:
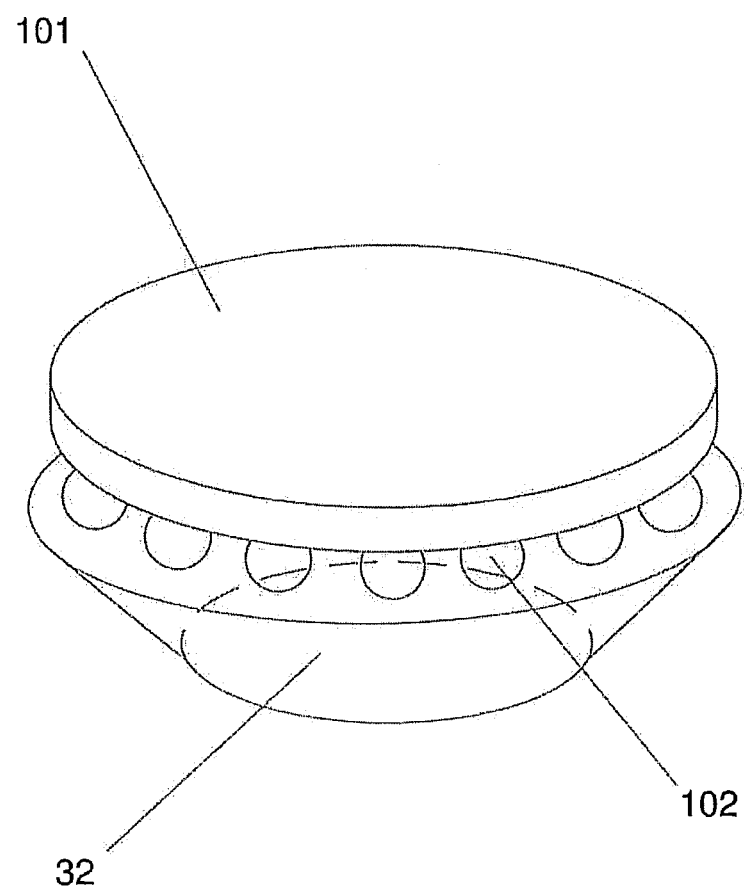
FIG. 1c shows a rotating base with bearings

Now referring to the above-referenced figures and exemplary FIG. 1c, base 101 may support device 5 and may allow device 5 to rotate in the direction of the blowing wind allowing the blades 13 to face the incoming direction of the wind. Said rotation may be assisted by bearings 102 located between turning base 101 and main base 32. Main base 32 may be constructed of a hard, durable material, for example stainless steel. Bearings 102 may substantially reduce friction, allowing for an easier rotating movement and therefore a more efficient device 5.

Figure 1D:
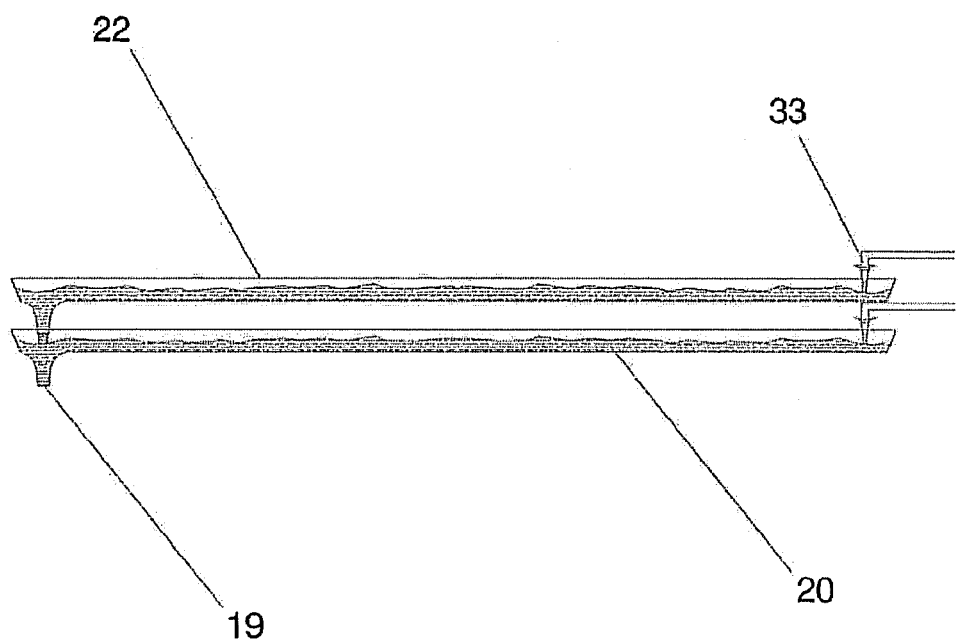
FIG. 1d shows a detail of $CO_2$-absorbing sub-containers

Referring to the above-referenced figures and exemplary FIG. 1d, sub-containers of container 22 may be filled with $CO_2$-absorbing material 20 through inlet tube 33. Drainage tube 19 may allow for sufficiently saturated $CO_2$-absorbing material to flow out to a main drainage tube.

Figure 1E:
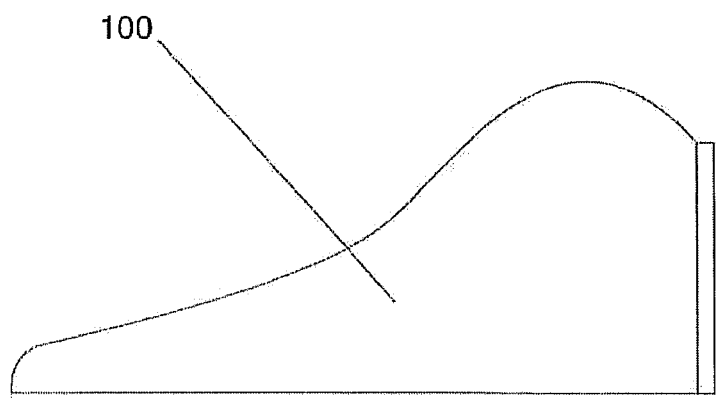
FIG. 1e shows a wind-tracking mechanism

Referring now to exemplary FIGS. 1 and 1e, a wind tracking mechanism 100 may be used to rotate or orient device 5. Wind tracking mechanism 100 have a substantially flat surface which may catch the wind in a fashion similar to a weather vane. Wind tracking mechanism 100 may be constructed of carbon-reinforced polymer, or as desired. Though a particular shape is disclosed, any shape which achieves a substantially similar function may be substituted. Further, instead of a passive orientation mechanism, conventional active wind sensors and a motor drive (not shown) may be used to rotate device 5 to more efficient position.

Figure 2:
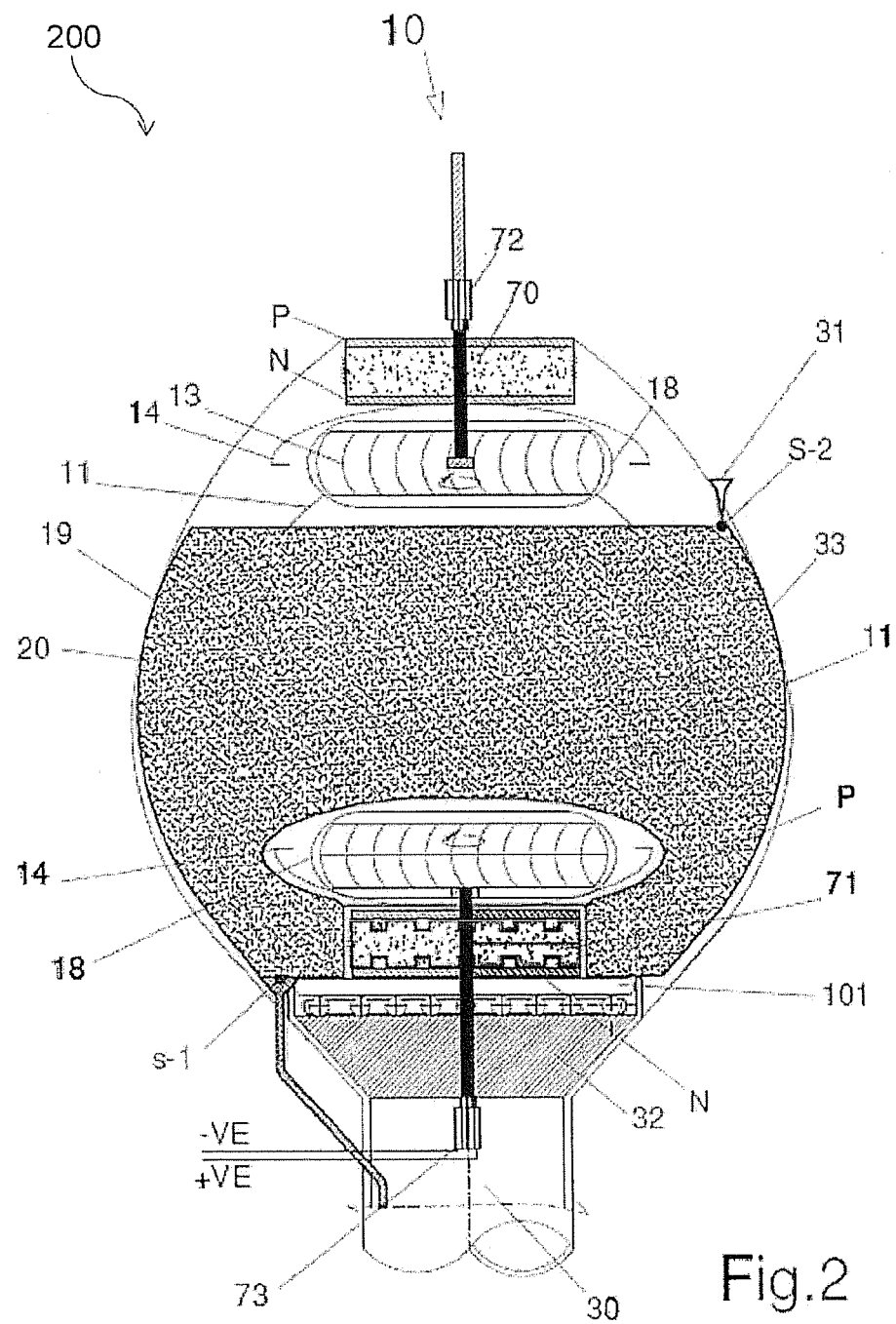
FIG. 2 shows a second embodiment of a carbon dioxide sequestering device, including a turbine Exemplary

According to exemplary FIG. 2, another embodiment may be disclosed as device 200. Many features of device 200 may be similar to or the same as in device 5, as shown in exemplary FIG. 1 and described above. Device 200 may have a single large container 22 for $CO_2$ capture. Container 22 may contain a $CO_2$-absorbing material 20. $CO_2$-absorbing material may be a solid particulate matter, for example micro crystals. Further, $CO_2$-absorbing material may be a form of a zeolitic imidazolate framework (ZIF). Different materials may be used for different situations or placements of device 200 to maximize efficacy. For example, ZIF-69 may be used in relatively low ambient temperature applications and ZIF-100 may be used in higher-temperature applications, such as in smoke stacks and exhaust pipes.

Air may enter device 200 through openings 18 and operate power generating stator 72 through interaction with blades 13. Additionally, air may interact with $CO_2$-absorbing material 20 in container 22. Once $CO_2$-absorbing material 20 reaches a saturation threshold, sensor S1 may open, allowing for the drainage of $CO_2$-absorbing material 20 by gravity. $CO_2$-absorbing material 20 may then be collected in a storage container, or as desired. $CO_2$ may later be recovered from $CO_2$-absorbing material for any further application, for example in micro-algae farms or bio-fuel, or as desired.

As described above, structure 14 may move in an upward and downward motion, creating pressure on DE cushions 70, 71. DE cushions 70, 71 may produce an electric current through the DE material contained therein upon pressure being applied to them. Additionally, blades 13 may be functionally coupled to shaft 10, which may cause shaft 10 to turn when wind blows across blades 13. Shaft 10 may turn inside a stator/dynamo 72/73 to produce electric current. The current produced by device 200 may be conducted to a battery for storage, or conducted to a grid, or as desired.

Figure 3:
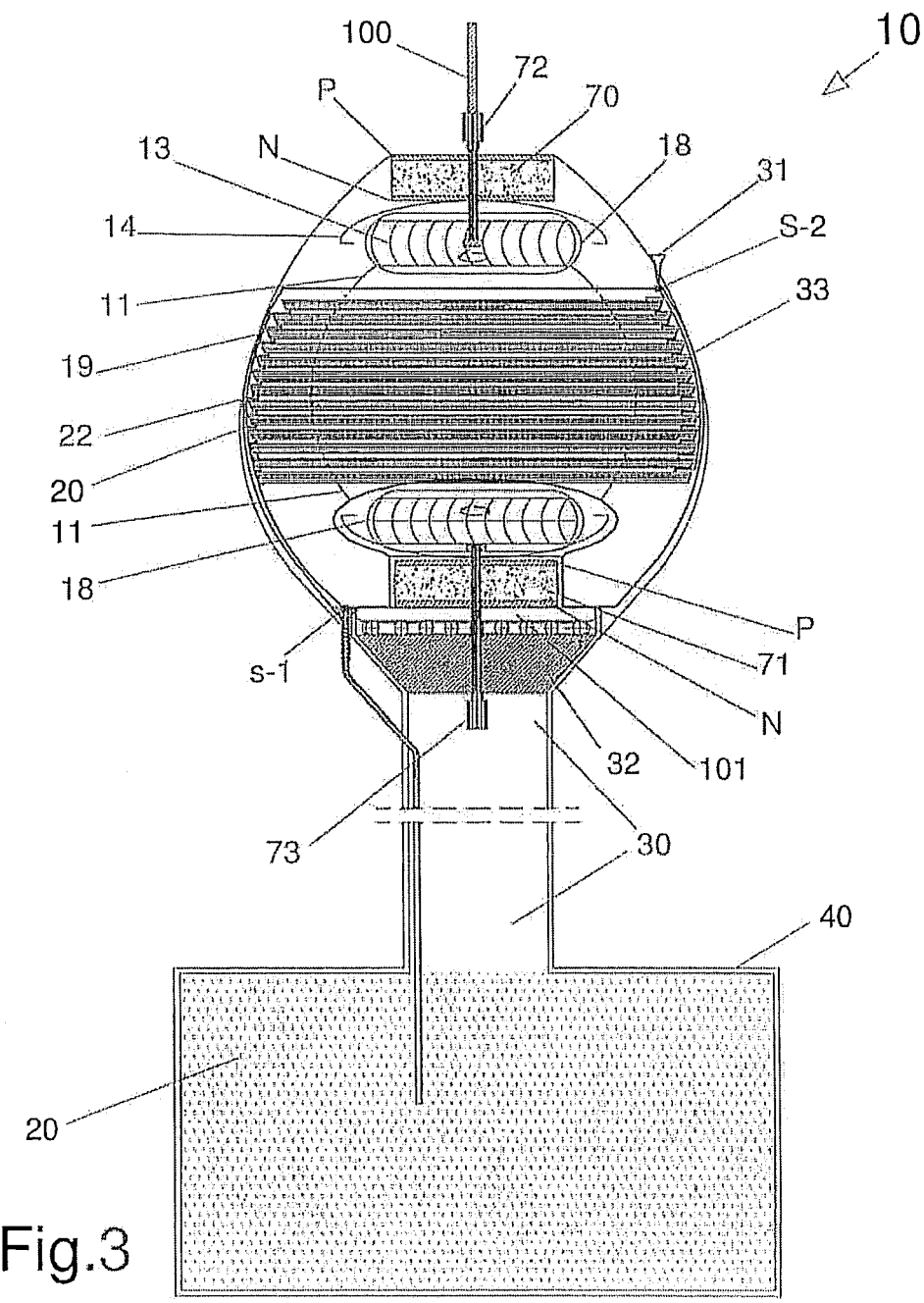
FIG. 3 shows a third embodiment of a carbon dioxide sequestering device, including a storage container Exemplary

As shown in exemplary FIG. 3, device 5 may be mounted on a tower with a storage container 40 at its base.

Figure 4:
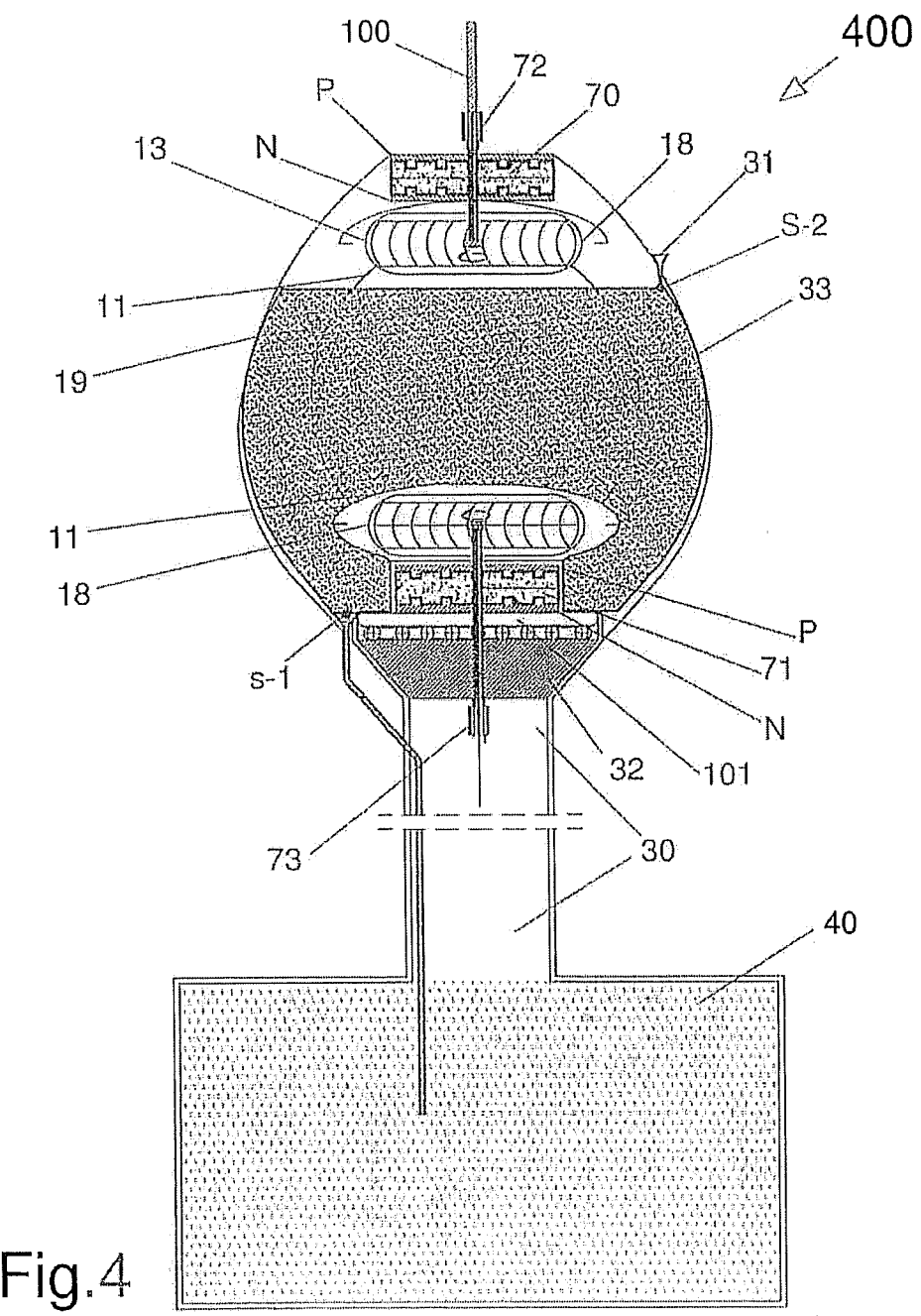
FIG. 4 shows a fourth embodiment of a carbon dioxide sequestering device, including a storage container Exemplary

Further, as shown in exemplary FIG. 4, device 200 may be incorporated into a structure 400 by mounting it on a tower with a storage container 40 at its base.

Figure 5:
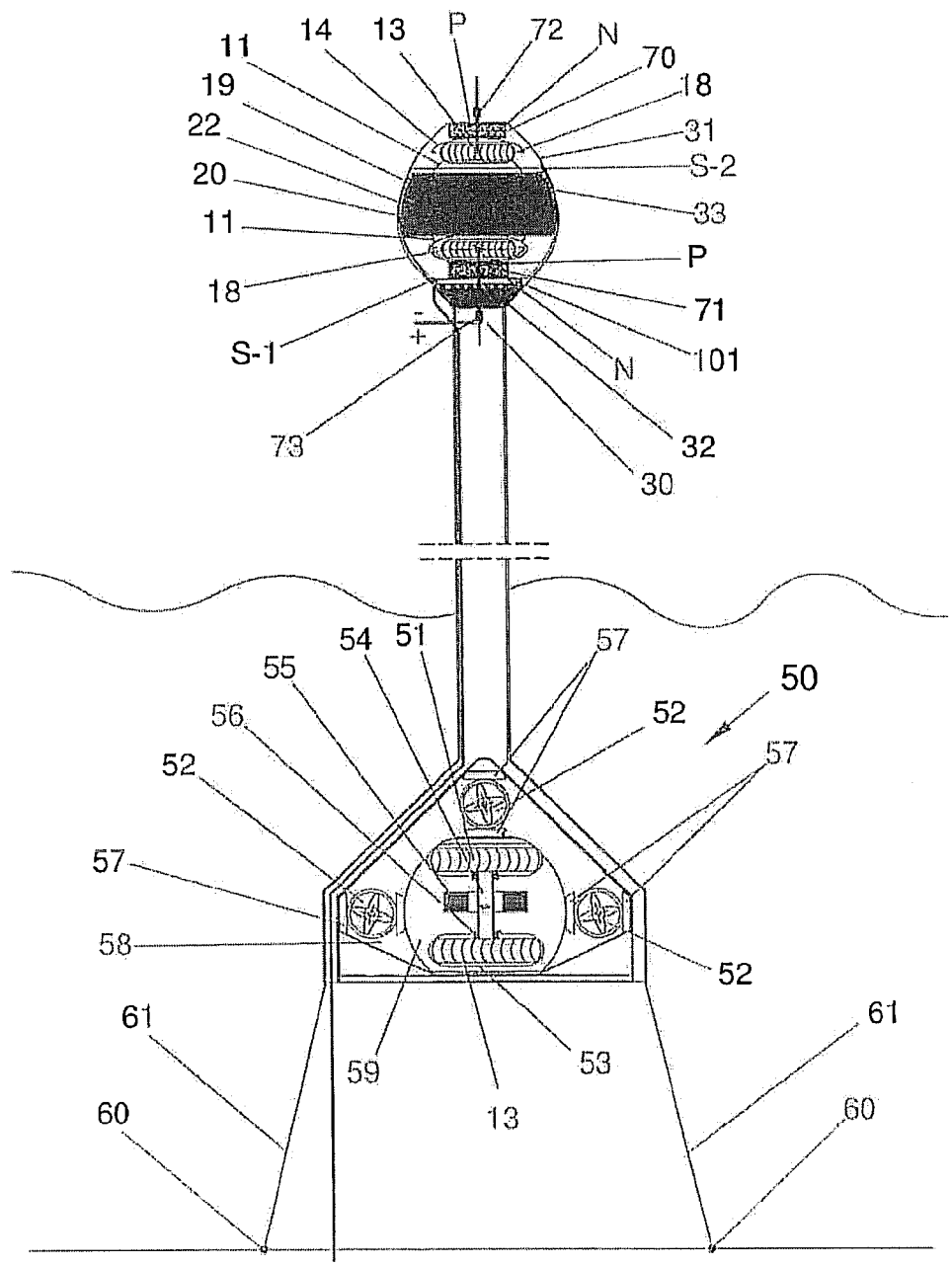
FIG. 5 shows a fifth embodiment of a carbon dioxide sequestering device, including an underwater turbine assembly Exemplary
Figure 5A:
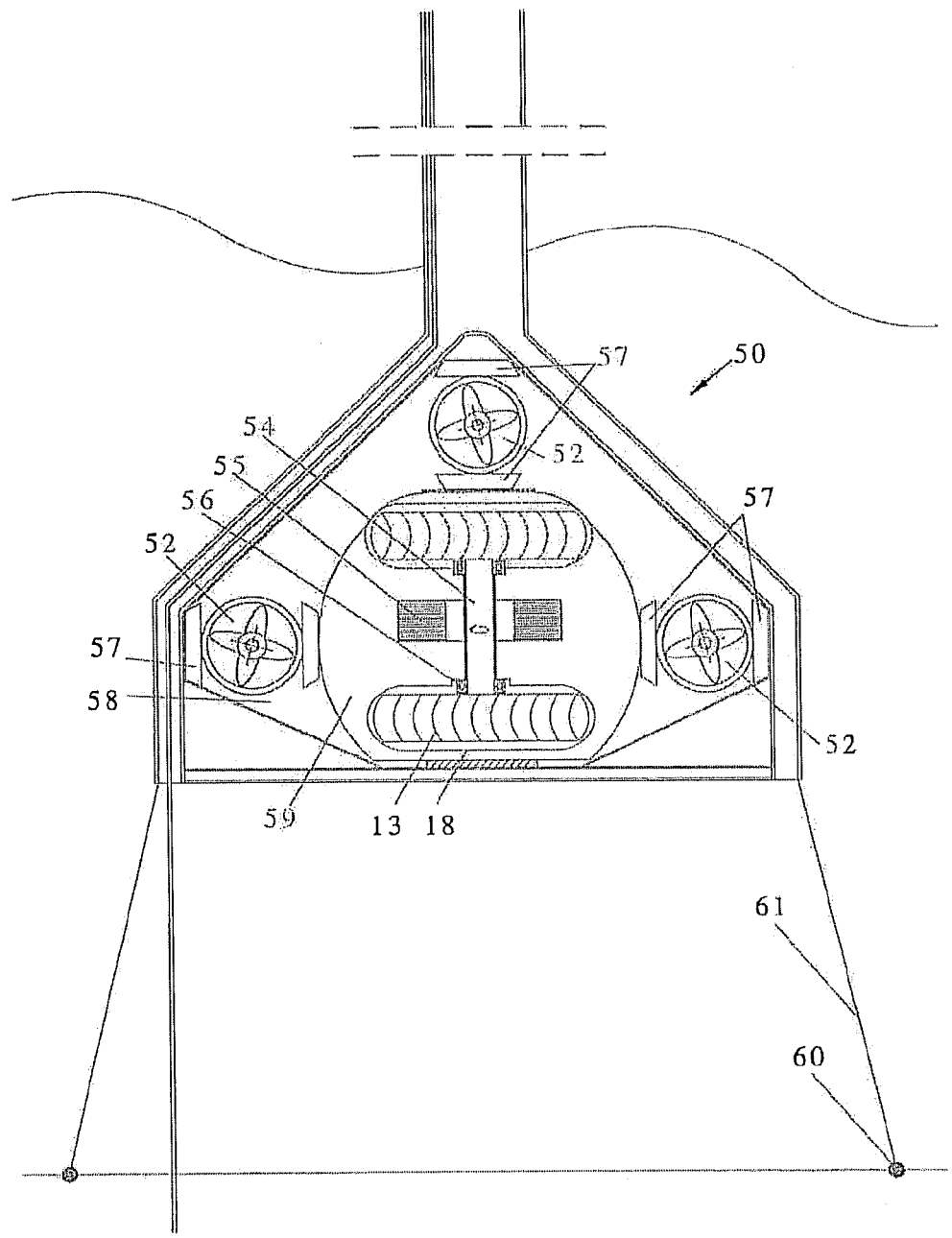
FIG. 5a shows an alternate embodiment of an underwater turbine assembly Exemplary

Now referring to exemplary FIGS. 5 and 5a, either of device 5 or device 200 may be mounted on a tower where the base of the tower is under water. Mounting a $CO_2$ sequestration device over water provides for a simple method of disposal because $CO_2$ may be injected through tubes into the mineral strata under the sea/ocean floor. Additionally, a secondary water-turbine device 50 may be incorporated into the underwater portion of a tower to increase power production through the use of ocean waves and water currents.

Water-turbine device 50 may include at least one turbine with blades 13. Preferably, at least two turbines may be included. An upper turbine 51 may be oriented to capture the low tidal currents during low tides and a lower turbine 53 may be oriented to capture the tidal currents during the high tide period. Additionally, other dual-motion turbines 52 may be capable of rotating and capturing current and wave energy in both directions. Shock-absorption cushions 57 may be located around various sections of water-turbine device 50 to protect the device from rough waves. Further, as mentioned previously, water-turbine device 50 may include a drainage system for saturated $CO_2$-absorbing material, allowing it to be injected into underground ocean mineral strata with special deep-sea pumps (not shown). The additional energy for the deep-sea pumps may be obtained from the electricity produced by the assembly. Water-turbine device 50 may be fixed on the ocean floor by means of water-resistant cables 61 mounted to anchors 60, or as desired.

In an alternative embodiment, device 5 or device 200 may be used for sucking up smoke containing $CO_2$ and directing said smoke into a conventional heat exchanger (not shown) to cool down the smoke to about 60° C. Water may be used to cool the smoke, or the smoke could be cooled by any other means, as desired. The cooled smoke may then be transferred to a separate container or area for carbon sequestration. For example, a system may be set up utilizing a catalyst and sea water to produce cement from the $CO_2$ in the smoke, as is known in the art.

Figure 5B:
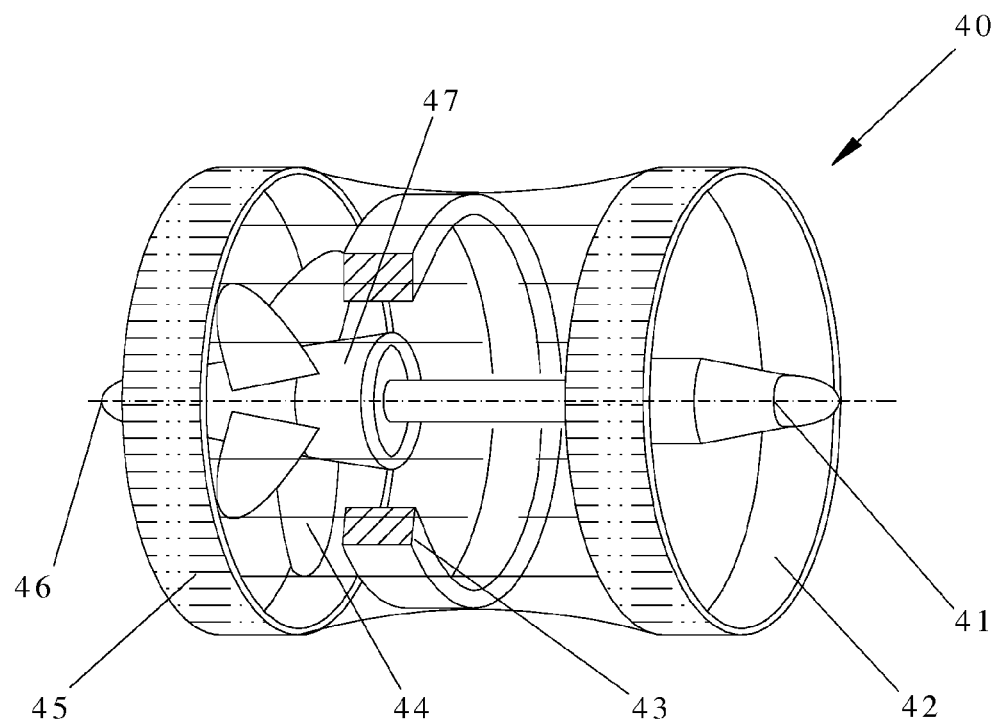
FIG. 5b shows a dual-motion turbine Exemplary

Referring to exemplary FIG. 5b, some detail of a dual-motion turbine 52 may be disclosed. Dual-motion turbine 52 may include an outer case 45, turbine blades 44, and a central stator magnet 43. Outer case may be constructed of aluminum, or as desired. Either end of turbine 52 may have an aerodynamic structure form 41/46 to allow smooth passage of sea water waves through its blades in both directions in such a way that the blades may rotate due to waves or tidal power and thus may cause shaft 47, onto which blades 44 may be fixed, to rotate inside a stator structure 41.

Blades 44 may be designed such that they may be caused to rotate both whether the waves are directed towards the shore (high tidal period) or when the waves come back towards the open see/ocean (low tidal period).

Figure 6:
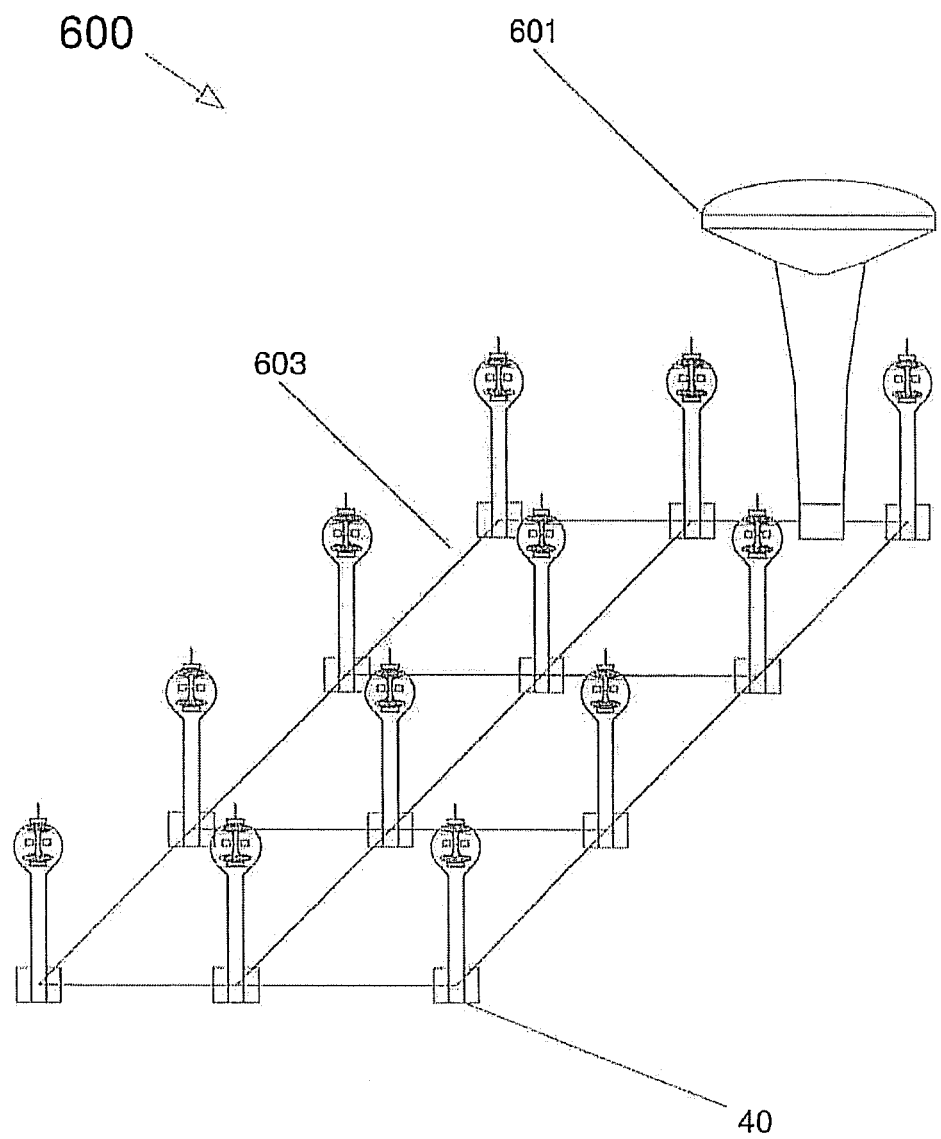
FIG. 6 shows an arrangement of multiple carbon dioxide sequestering devices Exemplary

Now referring to exemplary FIG. 6, a field 600 may include multiple of individual devices. Each individual device may be as shown in any of exemplary FIGS. 1-5, as described above, or as desired. Individual devices may be connected to a $CO_2$-absorbing material supply tower 601 via connecting pipes 603. Individual devices may have storage containers 40 to collect sufficiently saturated $CO_2$-absorbing material.

Figure 7:
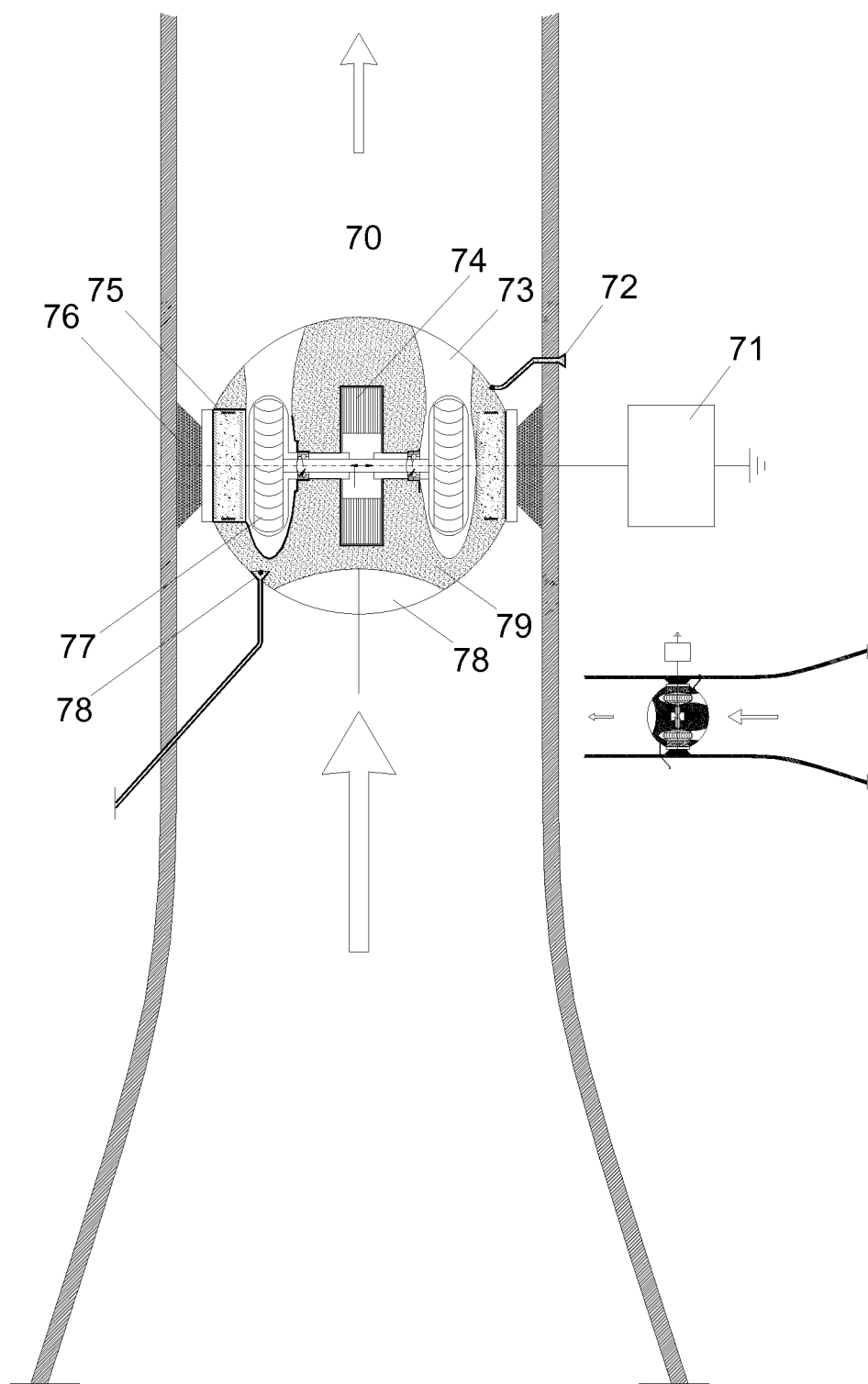
FIG. 7 shows a carbon dioxide sequestering device located in a smoke stack or exhaust pipe or other similar structure

Referring generally to exemplary FIGS. 1-2 and exemplary FIG. 7, in a non-limiting example, a carbon dioxide sequestering and power generating device 700 may be mounted in a smoke stack. As shown, the device may also be mounted in a horizontal fashion, for example in a car's exhaust pipe. Device 700 may utilize the above-described micro crystal $CO_2$-absorbing material (20), and may function in substantially the same way as device 200 as shown and described above. Preferably, a $CO_2$-absorbing material 20 may be used which is resistant to high temperature, for example ZIF-100. A battery B may store electrical power produced by device 700. At least two openings may serve as the inlet 31 and outlet 19 (with sensors) of the $CO_2$-absorbing material which may be refreshed once the $CO_2$-absorbing material reaches a saturation threshold. For example, when mounted in a vehicle's exhaust pipe, a sensor within the vehicle may light up indicating the saturation threshold has been met. Incoming air may enter device 700 through opening 11. A power generating stator/dynamo 55 with rotating blades 13 may be protected and stabilized by a set of shock absorbers 76. Additionally, DE cushions 70, 71 may also be utilized to generate electrical energy as described above. Stator 55 can generate a current which may be conducted by wires to a battery B in which the generated current may be stored.

In an alternative exemplary embodiment, device 700 may be used only as a power generating device, without a $CO_2$-absorbing material. Device 700 could then be used for sucking up smoke containing $CO_2$ and directing said smoke into a conventional heat exchanger (not shown) to cool down the smoke to about 60° C. Water may be used to cool the smoke, or the smoke could be cooled by any other means, as desired. The cooled smoke may then be transferred to a separate container or area for carbon sequestration. For example, a system may be set up utilizing a catalyst and sea water to produce cement from the $CO_2$ in the smoke, as is known in the art.

In another alternate embodiment, a heat exchanger may be integrated with a carbon dioxide sequestering and power generating device utilizing a multi-walled carbon nanotube thermocell to convert waste heat from a smoke stack and/or any industrial plant or exhaust pipe into electricity.

Other applications may include the absorption of CO and/or methane gases in industrial, agricultural, and residential applications.

Referring generally to exemplary FIGS. 1-7, according to at least one embodiment, a carbon dioxide sequestering and power generating device may be disclosed. Air may enter the device through at least one opening. The force of the air may drive a turbine for the production of electricity while $CO_2$ is captured using a passive sequestration process. Generated electricity may then be stored or used, as desired.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A carbon dioxide sequestering and power generating device comprising:
    a carbon dioxide-absorbing chamber;
    at least one turbine-driven dynamo functionally coupled to a turbine, the at least one turbine-driven dynamo configured to be driven by natural wind currents interacting with the turbine; and
    at least one dielectric cushion, said at least one dielectric cushion configured to produce an electric current when compressed.

2. The carbon dioxide sequestering and power generating device of claim 1 further comprising a base portion, said base portion configured to allow the carbon dioxide sequestering and power generating device to rotate.

3. The carbon dioxide sequestering and power generating device of claim 1 wherein the carbon dioxide-absorbing chamber further comprises a plurality of sub-containers, said sub-containers containing a carbon dioxide-absorbing material, wherein the carbon-dioxide absorbing material is one of a liquid or a solution.

4. The carbon dioxide sequestering and power generating device of claim 3 wherein the carbon dioxide-absorbing material is an aqueous solution of $Ca(OH)_2$.

5. The carbon dioxide sequestering and power generating device of claim 3 further comprising:
   an inlet tube; and
   a drainage tube;
   wherein said inlet tube is configured to deliver the carbon dioxide-absorbing material to the plurality of sub-containers, and said drainage tube is configured to remove spent carbon dioxide-absorbing material from the plurality of sub-containers.

6. The carbon dioxide sequestering and power generating device of claim 1 further comprising:
   at least one opening; and
   a wind tracking assembly configured to turn the carbon dioxide sequestering and power generating device such that natural wind currents may strike the turbine in an efficient manner.

7. The carbon dioxide sequestering and power generating device of claim 1 wherein the at least one dielectric cushion further comprises at least one layer, the at least one layer further comprising:
   a dielectric material;
   at least two electrodes; and
   an insulating material.

8. The carbon dioxide sequestering and power generating device of claim 1 wherein the carbon dioxide-absorbing chamber comprises a carbon dioxide-absorbing material, said carbon dioxide-absorbing material being in the form of solid particulate matter.

9. The carbon dioxide sequestering and power generating device of claim 8 wherein the carbon dioxide-absorbing material is a zeolitic imidazolate framework.

10. The carbon dioxide sequestering and power generating device of claim 1 further comprising a storage container, said storage container configured to receive spent carbon dioxide-absorbing material.

11. The carbon dioxide sequestering and power generating device of claim 1 further comprising a battery.

12. A carbon dioxide sequestering and power generating device comprising:
   a carbon dioxide-absorbing chamber;
   at least one turbine-driven dynamo functionally coupled to a turbine, said at least one turbine-driven dynamo configured to be driven by natural wind currents interacting with the turbine;
   at least one dielectric cushion, said at least one dielectric cushion configured to produce an electric current when compressed; and
   an underwater turbine assembly.

13. The carbon dioxide sequestering and power generating device of claim 12 wherein the underwater turbine assembly comprises:
   at least one single-direction turbine;
   at least one dual-direction turbine; and
   at least one dynamo functionally coupled to one of the at least one single-direction turbine and the at least one dual-direction turbine.

14. The carbon dioxide sequestering and power generating device of claim 13 wherein the at least one single-direction turbine is configured to be driven by one of a high tide and a low tide.

15. The carbon dioxide sequestering and power generating device of claim 13 wherein the at least one dual-direction turbine is configured to be driven by both of a high tide and a low tide.

16. A carbon dioxide sequestering and power generating system, comprising:
   at least one air inlet;
   at least one turbine-driven dynamo functionally coupled to a turbine, said at least one turbine-driven dynamo driven by natural wind currents interacting with the turbine;
   at least one dielectric cushion, said at least one dielectric cushion configured to produce an electric current when compressed; and
   a carbon dioxide-absorbing chamber;
   at least one air outlet
   wherein air may pass through said at least one air inlet, provide a driving force to said turbine, cause the at least one dielectric cushion to be compressed, pass through the carbon dioxide-absorbing chamber, and pass through the at least one air outlet.

17. The carbon dioxide sequestering and power generating system of claim 16, further comprising an underwater turbine assembly, said underwater turbine assembly comprising:
   at least one single-direction turbine;
   at least one dual-direction turbine; and
   at least one dynamo functionally coupled to one of the at least one single-direction turbine and the at least one dual-direction turbine;
   wherein water may pass through the underwater turbine assembly and provide a driving force to either or both of the at least one single-direction turbine and the at least one dual-direction turbine.

18. A method for removing carbon dioxide from air and generating electricity comprising the following steps:
   (1) causing a natural wind current to pass over and drive a turbine, said turbine functionally coupled to a dynamo configured to produce an electrical current; and
   (2) causing the same natural wind current to pass over a carbon dioxide-absorbing material, and
   (3) compressing a dielectric cushion to produce an electric current.

* * * * *